US008984619B2

United States Patent
Legacy et al.

(10) Patent No.: US 8,984,619 B2
(45) Date of Patent: *Mar. 17, 2015

(54) METHODS, SYSTEMS, AND COMPUTER READABLE MEDIA FOR ADAPTIVE ASSIGNMENT OF AN ACTIVE SECURITY ASSOCIATION INSTANCE IN A REDUNDANT GATEWAY CONFIGURATION

(71) Applicants: Allain Legacy, Ottawa (CA); Matthew Lorne Peters, Kanata (CA)

(72) Inventors: Allain Legacy, Ottawa (CA); Matthew Lorne Peters, Kanata (CA)

(73) Assignee: Gendband US LLC, Frisco, TX (US)

( * ) Notice: Subject to any disclaimer, the term of this patent is extended or adjusted under 35 U.S.C. 154(b) by 77 days.

This patent is subject to a terminal disclaimer.

(21) Appl. No.: 13/941,079

(22) Filed: Jul. 12, 2013

(65) Prior Publication Data

US 2013/0305347 A1    Nov. 14, 2013

Related U.S. Application Data

(63) Continuation of application No. 13/115,948, filed on May 25, 2011, now Pat. No. 8,490,172.

(51) Int. Cl.
*H04L 29/06* (2006.01)
*H04L 29/08* (2006.01)

(52) U.S. Cl.
CPC ........... *H04L 63/0209* (2013.01); *H04L 63/164* (2013.01); *H04L 63/0428* (2013.01); *H04L 67/1027* (2013.01)
USPC ................... 726/12; 726/13; 726/14; 726/15; 713/151; 713/152; 713/154; 713/155

(58) Field of Classification Search
CPC ........................ H04L 63/0209; H04L 63/164
USPC ........................................................ 726/12
See application file for complete search history.

(56) References Cited

U.S. PATENT DOCUMENTS

2008/0101218 A1 *   5/2008   Lei ................................ 370/219

* cited by examiner

*Primary Examiner* — Longbit Chai
(74) *Attorney, Agent, or Firm* — Haynes and Boone, LLP (57) ABSTRACT

According to one aspect, the subject matter described herein includes a method for communicating an encrypted data packet. The method includes steps occurring at a first gateway node. The method also includes receiving a data packet from a first host. The method further includes determining that a first security association (SA) instance associated with the data packet is in an inactive state. The method further includes identifying a second SA instance that is both associated with the data packet and in an active state. The method further includes forwarding the data packet to the second SA instance.

20 Claims, 9 Drawing Sheets

METHODS, SYSTEMS, AND COMPUTER READABLE MEDIA FOR ADAPTIVE ASSIGNMENT OF AN ACTIVE SECURITY ASSOCIATION INSTANCE IN A REDUNDANT GATEWAY CONFIGURATION

PRIORITY DATA

The present application is a continuation application of U.S. patent application Ser. No. 13/115,948, filed on May 25, 2011, which is incorporated herein by reference in its entirety.

TECHNICAL FIELD

The subject matter described herein relates to adaptive assignment of an active security association instance in a redundant gateway configuration. More specifically, the subject matter relates to methods, systems, and computer readable media for adaptive assignment of an active security association instance in a redundant gateway configuration.

BACKGROUND

Organizations may connect multiple local area networks (LANs) via a wide area network (WAN). Each LAN may interface with the WAN through one or more gateways. Often segments of a WAN pass through untrusted networks (e.g., the Internet) and operators commonly encrypt transmissions over such segments in order to increase security. Specialized security protocols may be utilized to efficiently encrypt communications at network gateways. Many of these security protocols, such as those contained within the Internet protocol security (IPsec) suite, include functionality for thwarting replay attacks.

A replay attack is characterized by a malicious user fraudulently retransmitting or delaying a previous valid data transmission. By retransmitting or delaying the previous transmission, the malicious user may masquerade as the legitimate user; fraudulently transmitting communications that appear to be from the legitimate user or intercepting and decrypting messages intended for the legitimate user.

One method for counteracting replay attacks is to utilize sequence numbers. Sequence numbers are maintained on a security association (SA) basis by the transmitting and receiving nodes (e.g., gateways or hosts). When a packet is transmitted, the transmitting node marks the packet with a sequence number. When the packet is received, the receiving node examines the sequence number. If the sequence number has already been received or is less than the trailing edge of the sequence number window for the SA, the packet is considered invalid by the receiving node. Alternatively, if the sequence number has not already been received and is within or ahead of the sequence number window for the SA, the packet is considered valid by the receiving node.

Network gateways may be setup in a redundant configuration in order to increase performance and reliability. Utilizing a redundant network gateway configuration, however, creates challenges in assigning sequence numbers to encrypted packets. Specifically, a gateway must ensure that it is cognizant of the activity of its peer gateways with respect to an SA before taking action itself. Additionally, coordinating gateway action may require increased levels of inter-gateway communication and be associated with substantial overhead. Accordingly, a need exists for methods, systems, and computer readable media for adaptive assignment of an active security association instance in a redundant gateway configuration.

SUMMARY

According to one aspect, the subject matter described herein includes a method for communicating an encrypted data packet. The method includes steps occurring at a first gateway node. The method also includes receiving a data packet from a first host. The method further includes determining that a first SA instance associated with the data packet is in an inactive state. The method further includes identifying a second SA instance that is both associated with the data packet and in an active state. The method further includes forwarding the data packet to the second SA instance.

According to another aspect, the subject matter described herein includes a system for communicating an encrypted data packet. The system includes a first gateway node. The first gateway node includes a communication interface. The first gateway node further includes an SA module. The SA module is configured to utilize the communication interface to receive, from a first host, a data packet. The SA module is further configured to determine that a first SA instance associated with the data packet is in an inactive state. The SA module is further configured to identify a second SA instance that is both associated with the data packet and in an active state. The SA module is further configured to utilize the communication interface to forward the data packet to the second SA instance.

As used herein, the term "node" refers to a physical computing platform including one or more processors and memory.

The subject matter described herein can be implemented in software in combination with hardware and/or firmware. For example, the subject matter described herein may be implemented in software executed by one or more processors. In one exemplary implementation, the subject matter described herein may be implemented using a non-transitory computer readable medium having stored thereon computer executable instructions that when executed by the processor of a computer control the computer to perform steps. Exemplary computer readable media suitable for implementing the subject matter described herein include non-transitory computer readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

Methods, systems, and computer readable media for communicating an encrypted data packet are provided. As explained above, a replay attack is characterized by retransmitting or delaying a previous valid data transmission. Replay attacks may be employed to fraudulently transmit packets that appear to be from a legitimate user or intercept and decrypt packets intended for a legitimate user. One approach to counteracting replay attacks is to utilize sequence numbers. Sequence numbers are maintained on an SA basis by transmitting and receiving nodes. An SA is a collection of shared security attributes between two or more network entities for supporting secure communications. When a packet associated with an SA is transmitted, the transmitting node marks the packet with the next available sequence number that corresponds to the SA. When the packet is received, the receiving node examines the sequence number and compares it with the sequence number window that corresponds to the SA associated with the packet. If the sequence number has already been received or is less than the trailing edge of the sequence number window for the SA, the packet is considered invalid by the receiving node. Alternatively, if the sequence number has not already been received and is within or ahead of the sequence number window for the SA, the packet is considered valid by the receiving node. If a malicious user attempts to "replay" a packet, the replay will be detected because the sequence number will have already been received or be less than the trailing edge of the sequence number window for the SA and the packet will be considered invalid. As packets are transmitted and received, the sequence number window slides or advances along a scale of monotonically increasing integers, ensuring that the valid range for impending packet transmissions and their receptions reflects previously transmitted and received packets.

Figure 1:
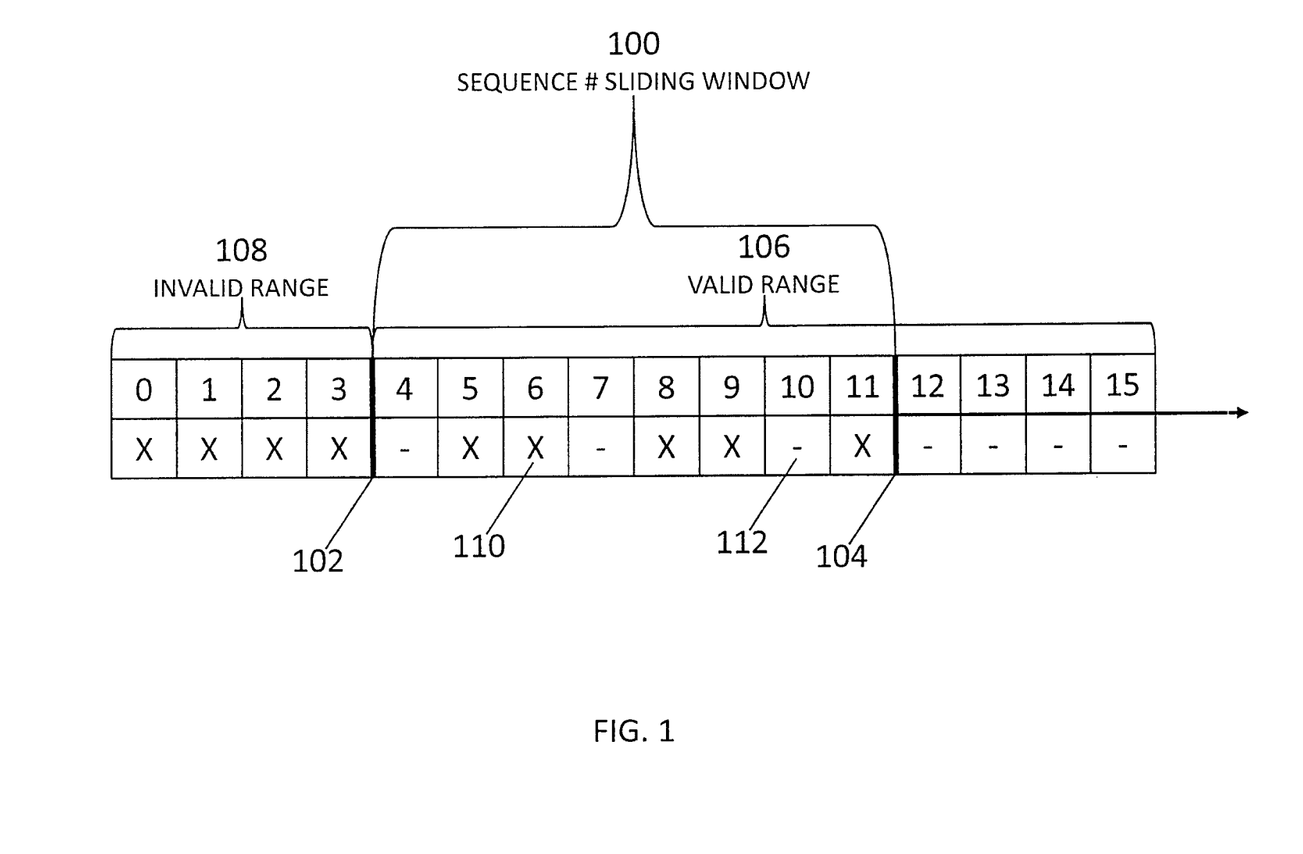
FIG. 1 is a block diagram illustrating an SA sequence number sliding 5 window for communicating an encrypted data packet according to an embodiment of the subject matter described herein.

FIG. 1 is a block diagram illustrating an SA sequence number sliding window for communicating an encrypted data packet according to an embodiment of the subject matter described herein. Referring to FIG. 1, SA sequence number sliding window 100 is characterized by a monotonically increasing range of sequence numbers. Sliding window 100 is delimited by trailing edge 102 and leading edge 104. Leading edge 104 corresponds to the position just after the sequence number associated with the last packet received. Trailing edge 102 lies at a predetermined fixed range behind leading edge 104. At a given moment in time, sliding window 100 defines what sequence numbers constitute valid range 106 and invalid range 108. Below each sequence number an "X" or "_" indicates whether a packet has been received that is marked with the corresponding sequence number. For example, "X" 110 indicates that a packet marked with sequence number "6" has already been received and "_" 112 indicates that a packet marked with sequence number "10" has not yet been received. The sequence number to the right of sliding window 100's leading edge 104 (i.e., "12") is the number that the next received packet is expected to bear. If the next packet fails to bear "12", but instead bears "13" sequence number "12" would be associated with a "missed" packet but the received packet itself would still be considered valid, allowing for transmission errors. If the next packet received is marked with sequence number "2," however, it will be considered invalid and ignored.

Figure 2:
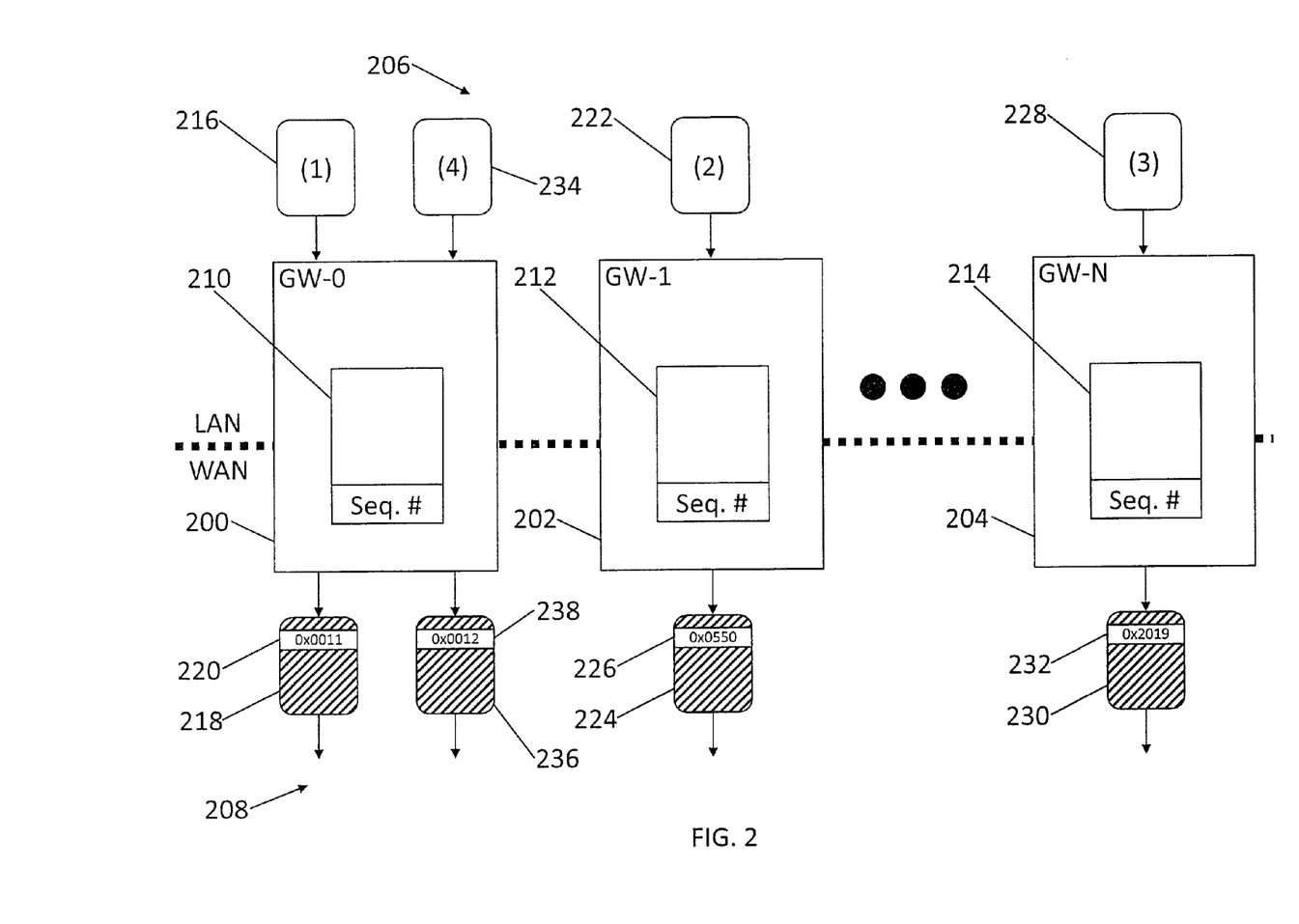
FIG. 2 is a network diagram illustrating a series of network gateways that interface a trusted network environment and an untrusted network environment.

FIG. 2 is a network diagram illustrating a series of network gateways that interface a trusted network environment and an untrusted network environment. Referring to FIG. 2, gateway nodes 200 and 202 through 204 interface network environment 206 with network environment 208. Network environment 206 may be a trusted network environment such as a LAN environment and thus data packets traversing network environment 206 may not need to be encrypted. Network environment 208 may be an untrusted network environment such as a WAN with segments passing through a public network (e.g., the Internet) and thus data packets traversing network environment 208 may need to be encrypted in order to increase security. For performance and reliability reasons, gateway nodes 200 and 202 through 204 may be configured to operate redundantly, with each being independently capable of encrypting packets received from network environment 206 and destined for network environment 208. While each of gateway nodes 200 and 202 through 204 is capable of performing the requisite encryption, such encryption increases in complexity when a network operator seeks to employ a sequence number approach for thwarting potential replay attacks.

As explained above, in order for a sequence number approach to be effectively employed a given gateway must know the next valid sequence number in the sliding window. Thus, for a transmitting gateway to encrypt a received data packet it must identify the SA associated with the data packet, retrieve the next available sequence number in the valid range for the identified SA, and mark the packet with the retrieved sequence number. In the context of a redundant gateway scheme, this process is complicated by the possibility that another gateway in the redundant system may have transmitted packet(s) associated with the same SA since the transmitting gateway's previous transmission and thus the transmitting gateway's sliding window may not have advanced to reflect these intervening transmissions. For example, each of gateway nodes 200 and 202 through 204 may be configured to support a secure communication. Accordingly, gateway nodes 200 and 202 through 204 may respectively have SA instances 210, 212, and 214 associated with the supported secure communication. Gateway node 200 may receive an unencrypted data packet 216 from network environment 206. Gateway node 200 may identify unencrypted data packet 216 as being associated with SA instance 210 and encrypt packet 216 via SA instance 210 resulting in encrypted data packet 218 for transmission into network environment 208. When gateway node 200 encrypts packet 216 it will mark it with a sequence number 220. Subsequently, gateway node 202 may receive an unencrypted data packet 222 from network environment 206. Gateway node 202 may identify unencrypted data packet 222 as being associated with SA instance 212 and encrypt packet 222 via SA instance 212 resulting in encrypted data packet 224 for transmission into network environment 208. When gateway node 202 encrypts packet 222 it will mark it with a sequence number 226. Similarly, gateway node 204 may receive an unencrypted data packet 228 from network environment 206. Gateway node 204 may identify unencrypted data packet 228 as being associated with SA instance 214 and encrypt packet 228 via SA instance 214 resulting in encrypted data packet 230 for transmission into network environment 208. When gateway node 204 encrypts packet 228 it will mark it with a sequence number 232. Following the transmission of encrypted packet 230 by gateway node 204, gateway node 200 may receive an unencrypted data packet 234 from network environment 206. Gateway node 200 may identify unencrypted data packet 234 as being associated with SA instance 210 and encrypt packet 234 via SA instance 210 resulting in encrypted data packet 236 for transmission into network environment 208. When gateway node 200 encrypts packet 234 it will mark it with a sequence number 238, however, sequence number 238 will be determined based on SA instance 210's sliding sequence number window which will not reflect the intervening encryptions of packets 222 and 228. Accordingly, gateway nodes that are employed in a redundant scheme must be collectively managed so that the SA instances of each gateway within the redundant scheme are cognizant of each other's transmissions.

Figure 3:
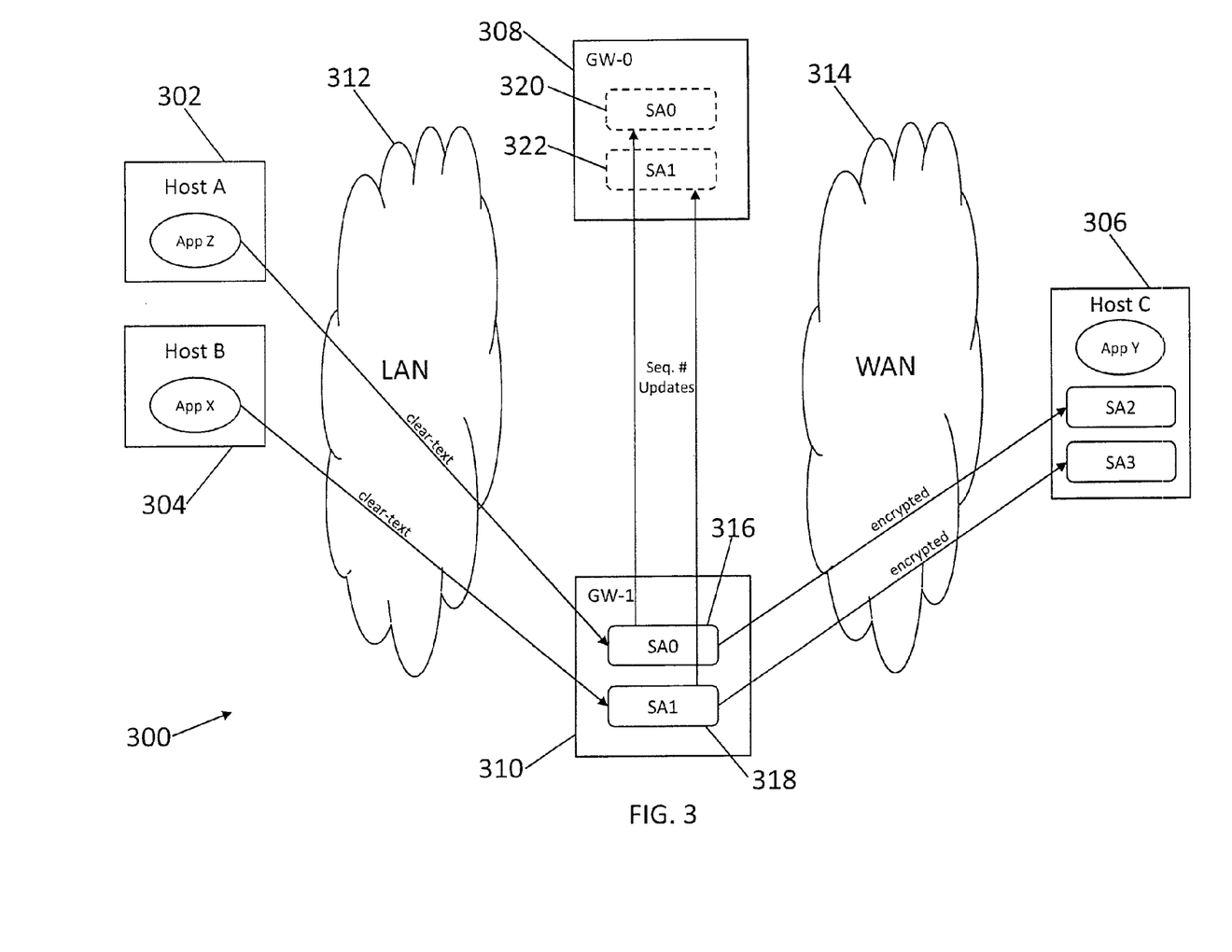
FIG. 3 is a network diagram illustrating redundant network gateways in active/standby configuration for communicating encrypted data packets.

FIG. 3 is a network diagram illustrating redundant network gateways in active/standby configuration for communicating encrypted data packets. Referring to FIG. 3, network environment 300 may include host nodes 302, 304, and 306. Host nodes 302 and 304 may communicate with host node 306 via gateway nodes 308 and 310. Network environment 300 may include a trusted portion, such as LAN 312, and an untrusted portion, such as WAN 314. Because WAN 314 may include segments that traverse public networks (e.g., the Internet) it may be desirable to encrypt data packets over WAN 314 to increase security. Gateway nodes 308 and 310 may be configured to utilize security protocols that efficiently encrypt communications and include functionality for thwarting replay attacks. For example, gateway nodes 308 and 310 may be configured to utilize the IPsec protocol.

Gateway nodes 308 and 310 may be configured in an active/standby configuration to provide reliability and redundancy. For example, gateway node 308 may be configured as a standby gateway for gateway node 310. As a standby gateway for gateway node 310, gateway node 308 may have a copy of each SA instance that exists on gateway node 310. For example, gateway node 310 may have two active SA instances 316 and 318, and gateway node 308 may have two counterpart inactive SA instances 320 and 322, respectively corresponding to SA instances 316 and 318. SA instances 316 and 318 may actively process data packets associated with secure communications between host nodes 302, 304, and 306. Such processing may include encryption and may further include marking each encrypted packet with a sequence number. SA instances 316 and 318 may periodically transmit sequence number updates to their counterpart SA instances 320 and 322 to ensure that SA instances 320 and 322 are aware of the current sequence number in the event that gateway node 310 experiences a fault and gateway node 308 is required to assume an active role. Any packets arriving at gateway node 308 while it is in the inactive state or while its SA instances (i.e., 320 or 322) are in the inactive state results in those packets being forwarded to the corresponding active SA instance on active gateway node 310.

Absent a fault at gateway node 310, data packets traversing network environment 300 will utilize gateway node 310. For example, data packets from host node 302 may utilize gateway node 310 and SA instance 316 en route to host node 306. Similarly, data packets from host node 304 may utilize gateway node 310 and SA instance 318 en route to host node 306. In the event of a fault at gateway node 310, data packets traversing network environment 300 will utilize gateway node 308. For example, if a fault occurs at gateway node 310, data packets from host node 302 may utilize gateway node 308 and SA instance 320 en route to host node 306 (not illustrated). Similarly, if a fault occurs at gateway node 310, data packets from host node 304 may utilize gateway node 308 and SA instance 322 en route to host node 306 (not illustrated).

Utilizing redundant network gateways in active/standby configuration for communicating encrypted data packets is associated with several performance disadvantages. For example, in an active/standby configuration, all resources associated with the standby gateway(s) are ordinarily idle and therefore underutilized. In contrast, resources associated with the active gateway(s) are often heavily utilized; increasing the probability of a fault. For example, absent a fault at gateway node 310, all traffic between host nodes 302, 304, and 306 is routed via gateway node 310, while gateway node 308 remains idle. In addition to failing to provide adequate load balancing, the active/standby configuration is also associated with substantial overhead because SA instances associated with the active gateway(s) must periodically send sequence number updates to their counterpart SA instances associated with standby gateway(s). For example, gateway node 310 must periodically send sequence number updates to gateway node 308. Additionally, any data packets received by the standby gateway(s) must be forwarded to the active gateway(s) for processing. For example, if gateway node 308 receives a data packet associated with either "SA0" or "SA1" and destined for host node 306 while gateway node 310 is designated as the active network gateway, gateway node 308 must forward the data packet to gateway node 310 (not illustrated). Often, inter-gateway forwarding between the active and standby gateway(s) incurs substantial cost due to the necessary utilization of a communication channel between disparately located sites. When a fault does occur at an active gateway, all traffic associated with the failed gateway will experience a temporary interrupt. For example, if a fault occurs at gateway node 310, traffic routed from host node 302 to host node 306 via gateway node 310 will experience an interruption. Additionally, traffic routed from host node 304 to host node 306 via gateway node 310 will also experience an interruption.

Figure 4:
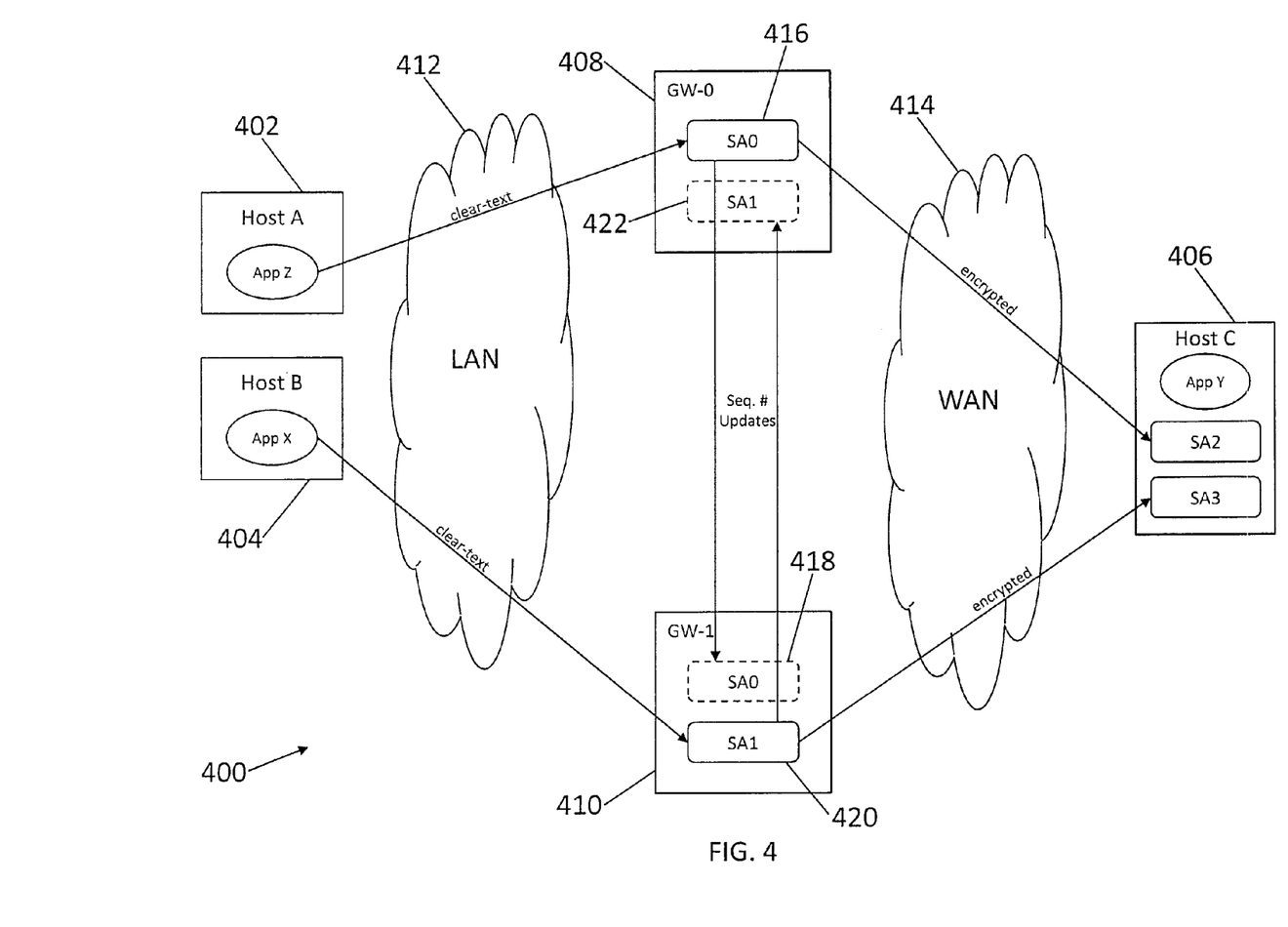
FIG. 4 is a network diagram illustrating an exemplary environment for performing adaptive assignment of an active SA instance in a redundant gateway configuration according to embodiments of the subject matter described 15 herein.

FIG. 4 is a network diagram illustrating an exemplary environment for performing adaptive assignment of an active SA instance in a redundant gateway configuration according to embodiments of the subject matter described herein. Referring to FIG. 4, network environment 400 may include host nodes 5 402, 404, and 406. Host nodes 402 and 404 may communicate with host node 406 via gateway nodes 408 and 410. Network environment 400 may include a trusted portion, such as LAN 412, and an untrusted portion, such as WAN 414. Because WAN 414 may include segments that traverse public networks (e.g., the Internet) it may be desirable to encrypt data packets over WAN 414 to 10 increase security. Gateway nodes 408 and 410 may be configured to utilize security protocols that efficiently encrypt communications and include functionality for thwarting replay attacks. For example, gateway nodes 408 and 410 may be configured to utilize the IPsec protocol.

In accordance with embodiments of the subject matter described herein, gateway nodes 408 and 410 may be configured to adaptively assign active SA instances. Utilizing adaptive assignment of active SA instances enables multiple network gateways to collaborate to encrypt data packets on an SA basis. Unlike an active/standby approach in which a network gateway is designated as either active or standby, utilizing adaptive assignment allows individual SA instances to be designated as active or standby. For example, gateway node 408 includes SA instance 416, which is designated as the active SA instance for "SA0." Gateway node 410 includes a counterpart inactive SA instance 418 for "SA0." Similarly, gateway node 410 includes SA instance 420, which is designated as the active SA instance for "SA1." Gateway node 408 includes a counterpart inactive SA instance 422 for "SA1." Each active SA instance provides sequence number updates to its inactive SA instance counterparts. For example, SA instance 416 provides sequence number updates to SA instance 418. Similarly, SA instance 420 provides sequence number updates to SA instance 422. There is no inherit limit to the number of SAs that are possible, nor is there a limit to the number of inactive SA instances for each SA. For simplicity sake, however, only two SAs, each with a single active and single inactive instance, are illustrated.

Utilizing adaptive SA assignment provides several performance advantages over an active/standby gateway configuration. For example, because the active/inactive designation is done on an SA basis rather than a network gateway basis, all network gateways with active SA instances not experiencing a fault are able to bear a portion of the load. For example, absent a fault at gateway nodes 408 and 410, data packets traversing network environment 400 may utilize either of gateway nodes 408 and 410. For example, data packets from host node 402 may utilize gateway node 408 and SA instance 416 en route to host node 406. Similarly, data packets from host node 404 may utilize gateway node 410 and SA instance 420 en route to host node 406. Accordingly, it is possible to distribute the assignment of active SA instances across multiple network gateways to achieve load balancing. Moreover, because adaptive assignment is done on an SA basis it is possible to have active SA instances assigned to the network gateways that receive the most traffic associated with their particular SA. For example, gateway node 408 may receive a larger number of packets associated with "SA0" than gateway node 410. Similarly, gateway node 410 may receive a larger number of packets associated with "SA1" than gateway node 408. If, however, gateway node 410 began to receive more packets associated with "SA0" than gateway node 408, gateway node 408 and SA instance 416 could detect this condition and adaptively assign SA instance 418 as the active SA instance for "SA0." Similarly, if gateway node 408 began to receive more packets associated with "SA1" than gateway node 410, gateway node 410 and SA instance 420 could detect this condition and adaptively assign SA instance 422 as the active SA instance for "SA1."

The ability to dynamically designate an SA instance as active on an SA basis offers a distinct advantage over an active/standby gateway configuration by minimizing the number of inter-gateway packet forwards required. This is possible because an SA instance may be designated as active on the network gateway that receives the most data packets associated with the particular SA. Accordingly, most data packets will arrive at a network gateway having the SA instance they are associated with designated as active; minimizing the chance that an inter-gateway forward will be required. Additionally, the determination of which SA instance to designate as active for a particular SA may take a variety of additional factors into account. These additional factors may include: the total number of data packets received by a network gateway during a sampling period, relative to the total number of data packets received by other network gateways during the same sampling period; the processor utilization of a network gateway, relative to processor utilization for other network gateways; and the percentage of total traffic handled by a network gateway that is encrypted during a sampling period, relative to the percentage of total traffic handled by other network gateways that is encrypted during the same sampling period. A determination to designate an SA instance as active may be made at any time and may be made in response to a triggering event. Exemplary triggering events include: time based triggers, packet count based triggers; configuration event triggers; external network triggers; and resource limit threshold triggers.

While increasing performance by enabling network gateways to load balance on an SA basis, adaptive assignment continues to provide reliability and redundancy. For example, in the event of a fault at gateway node 408, SA instance 418 may be designated as the active SA instance for data packets associated with "SA0" (not illustrated). Similarly, in the event of a fault at gateway node 410, SA instance 422 may be designated as the active SA instance for data packets associated with "SA1" (not illustrated). Additionally, effectively load balancing across the network gateways decreases the chances of a fault and simultaneously reduces the overall impact on performance of the gateways in the event of a fault. For example, by load balancing traffic between gateway nodes 408 and 410 the individual resource utilization of each network gateway is reduced and the chance of a fault occurring at either gateway node 408 or gateway node 410 is reduced. Moreover, because gateway node 408 is only handling data packets associated with "SA0" and gateway node 410 is only handling data packets associated with "SA1," in the event gateway node 408 experiences a fault the impact on data packets associated with "SA1" is marginal. Similarly, in the event gateway node 410 experiences a fault the impact on data packets associated with "SA0" is marginal.

Figure 5A:
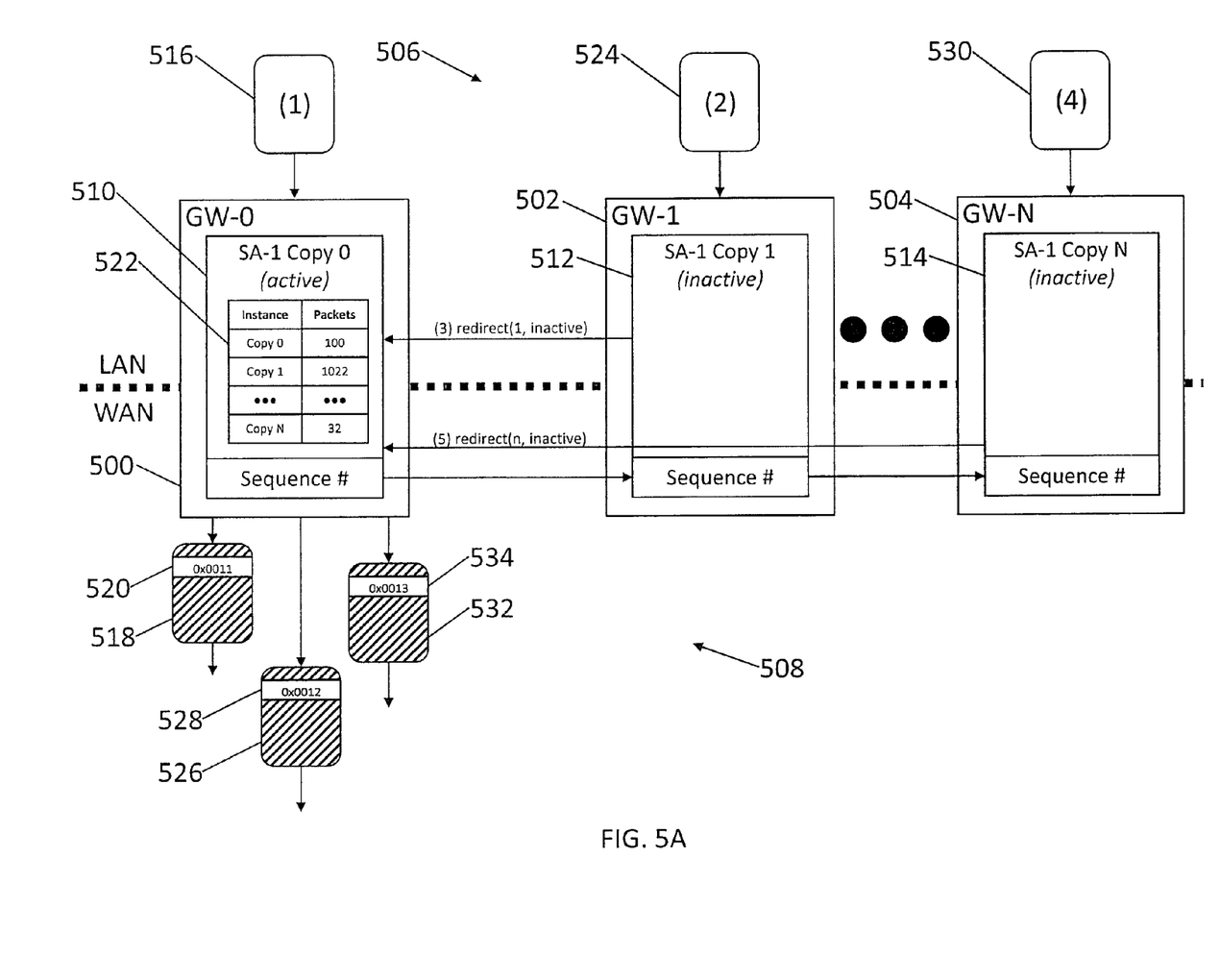
FIGS. 5A-5C are network diagrams illustrating various stages of an exemplary adaptive assignment of an active SA instance in accordance with embodiments of the subject matter described herein.
Figure 5B:
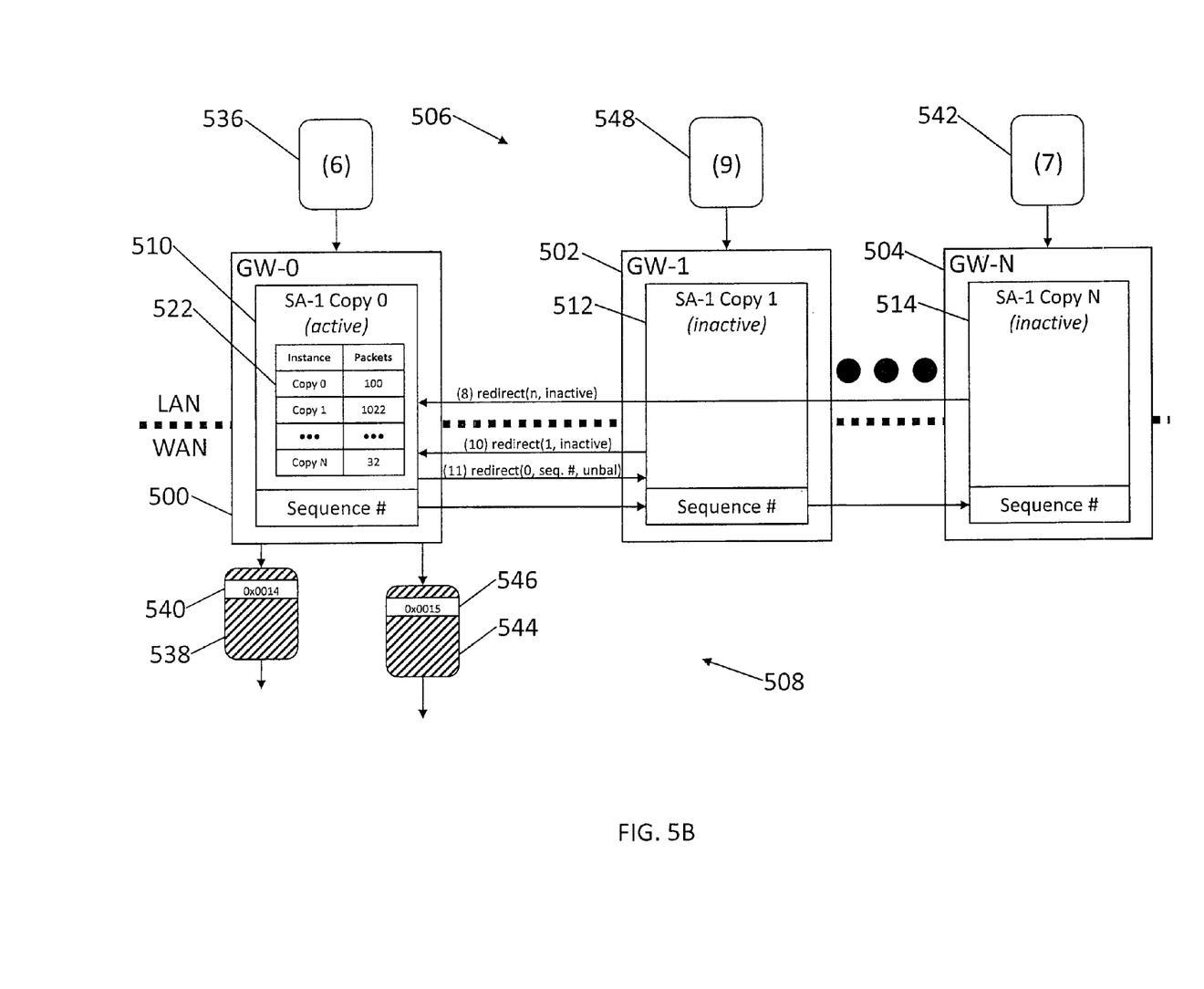
Figure 5C:
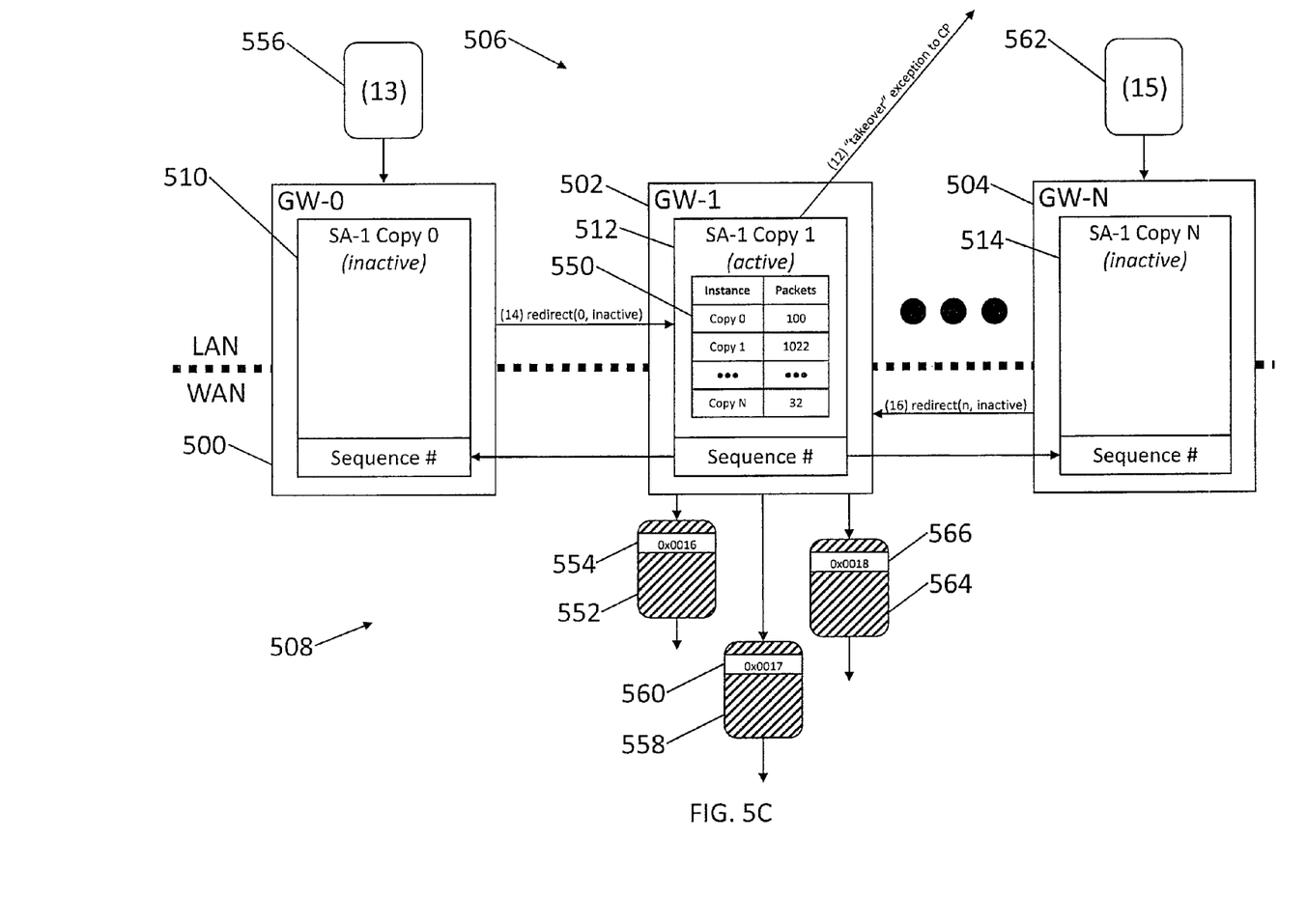

FIGS. 5A-5C are network diagrams illustrating various stages of an exemplary adaptive assignment of an active SA instance in accordance with embodiments of the subject matter described herein. Referring to FIG. 5A, gateway nodes 500 and 502 through 504 may interface LAN network environment 506 with WAN network environment 508. LAN network environment 506 may be a trusted network environment. WAN network environment 508 may be an untrusted network environment. Because WAN network environment 508 may include segments that traverse public networks (e.g., the Internet) it may be desirable to encrypt data packets in WAN network environment 508. Gateway nodes 500 and 502 through 504 may be configured to utilize security protocols that efficiently encrypt communications and include functionality for thwarting replay attacks. For example, gateway nodes 500 and 502 through 504 may be configured to utilize the IPsec protocol. In accordance with embodiments of the subject matter described herein, each of gateway nodes 500 and 502 through 504 respectively has an SA instance 510, 512, and 514 associated with a common SA (i.e., "SA-1"). As illustrated, gateway node 500's SA instance 510 is designated as active, gateway node 502's SA instance 512 is designated as inactive, and gateway node 504's SA instance 514 is designated as inactive. As an active SA instance, gateway node 500's SA instance 510 may provide periodic sequence number updates to SA instances 512 and 514.

At step 1, gateway node 500 may receive an unencrypted data packet 516 from LAN network environment 506. Gateway node 500 may identify unencrypted data packet 516 as being associated with "SA-1," identify SA instance 510 as being gateway node 500's SA instance for "SA-1," and identify that SA instance 510 is designated as active. Having received unencrypted data packet 516 and identified an available active SA instance 510 associated with data packet 516, gateway node 500 may utilize SA instance 510 to encrypt data packet 516, resulting in encrypted data packet 518 for transmission into network environment 508. In encrypting data packet 516, gateway node 500 may utilize SA instance 510 to obtain the next available sequence number associated with "SA-1" and mark data packet 518 with the obtained sequence number 520. As the active SA instance for "SA-1," SA instance 510 may maintain SA table 522 for "SA-1." SA table 522 may contain a list of existing SA instances for "SA-1." For example, table 522 may contain entries corresponding to SA instances 510, 512, and 514. SA table 522 may further contain information identifying the number of packets received by each of the SA instances associated with "SA-1." For example, SA table 522 includes entries specifying that SA instance 510 has received "100" packets associated with "SA-1," that SA instance 512 has received "1022" packets associated with "SA-1," and that SA instance 514 has received "32" packets associated with "SA-1." (Note that the entries illustrated in SA table 522 are for illustrative purposes and may not correspond to exemplary scenarios described herein.)

At step 2, gateway node 502 may receive an unencrypted data packet 524 from LAN network environment 506. Gateway node 502 may identify unencrypted data packet 524 as being associated with "SA-1," identify SA instance 512 as being gateway node 502's SA instance for "SA-1," and identify that SA instance 512 is designated as inactive. In response to determining that SA instance 512 is designated as inactive, gateway node 502 may utilize SA instance 512 to identify an active SA instance associated with data packet 524.

For example, gateway node 502 may utilize SA instance 512 to identify SA instance 510 as being associated with data packet 524 and as being designated as active. Having identified SA instance 510 as being associated with data packet 524 and as designated as active, at step 3, SA instance 512 may forward data packet 524 to gateway node 500. SA instance 512 may mark data packet 524 as having been redirected by SA instance 512 and further indicate that SA instance 512 is currently designated as inactive. Upon receiving data packet 524, gateway node 500 may identify data packet 524 as being associated with SA instance 510 and may identify that SA instance 510 is designated as active. SA instance 510 may further identify that data packet 524 has been forwarded by SA instance 512. Having received data packet 524 and identified SA instance 510 as associated with data packet 524, gateway node 500 may utilize SA instance 510 to encrypt data packet 524, resulting in encrypted data packet 526 for transmission into network environment 508. In encrypting data packet 524, gateway node 500 may utilize SA instance 510 to obtain the next available sequence number associated with "SA-1" and mark data packet 526 with the obtained sequence number 528. As the active SA instance for "SA-1," SA instance 510 may update SA table 522 to reflect that an additional packet associated with "SA-1" has been received from SA instance 512.

At step 4, gateway node 504 may receive an unencrypted data packet 530 from LAN network environment 506. Gateway node 504 may identify unencrypted data packet 530 as being associated with "SA-1," identify SA instance 514 as being gateway node 504's SA instance for "SA-1," and identify that SA instance 514 is designated as inactive. In response to determining that SA instance 514 is designated as inactive, gateway node 504 may utilize SA instance 514 to identify an active SA instance associated with data packet 530. For example, gateway node 504 may utilize SA instance 514 to identify SA instance 510 as being associated with data packet 530 and as being designated as active. Having identified SA instance 510 as being associated with data packet 530 and as designated as active, at step 5, SA instance 514 may forward data packet 530 to gateway node 500. SA instance 514 may mark data packet 530 as having been redirected by SA instance 514 and further indicate that SA instance 514 is currently designated as inactive. Upon receiving data packet 530, gateway node 500 may identify data packet 530 as being associated with SA instance 510 and may identify that SA instance 510 is designated as active. SA instance 510 may further identify that data packet 530 has been forwarded by SA instance 514. Having received data packet 530 and identified SA instance 510 as associated with data packet 530, gateway node 500 may utilize SA instance 510 to encrypt data packet 530, resulting in encrypted data packet 532 for transmission into network environment 508. In encrypting data packet 530, gateway node 500 may utilize SA instance 510 to obtain the next available sequence number associated with "SA-1" and mark data packet 532 with the obtained sequence number 534. As the active SA instance for "SA-1," SA instance 510 may update SA table 522 to reflect that an additional packet associated with "SA-1" has been received from SA instance 514.

Referring to FIG. 5B, at step 6, gateway node 500 may receive an unencrypted data packet 536 from LAN network environment 506. Gateway node 500 may identify unencrypted data packet 536 as being associated with "SA-1," identify SA instance 510 as being gateway node 500's SA instance for "SA-1," and identify that SA instance 510 is designated as active. Having received unencrypted data packet 536 and identified an available active SA instance 510 associated with data packet 536, gateway node 500 may utilize SA instance 510 to encrypt data packet 536, resulting in encrypted data packet 538 for transmission into network environment 508. In encrypting data packet 536, gateway node 500 may utilize SA instance 510 to obtain the next available sequence number associated with "SA-1" and mark data packet 538 with the obtained sequence number 540. As the active SA instance for "SA-1," SA instance 510 may update SA table 522 to reflect that it has received an additional packet associated with "SA-1."

At step 7, gateway node 504 may receive an unencrypted data packet 542 from LAN network environment 506. Gateway node 504 may identify unencrypted data packet 542 as being associated with "SA-1," identify SA instance 514 as being gateway node 504's SA instance for "SA-1," and identify that SA instance 514 is designated as inactive. In response to determining that SA instance 514 is designated as inactive, gateway node 504 may utilize SA instance 514 to identify an active SA instance associated with data packet 542. For example, gateway node 504 may utilize SA instance 514 to identify SA instance 510 as being associated with data packet 542 and as being designated as active. Having identified SA instance 510 as being associated with data packet 542 and as designated as active, at step 8, SA instance 514 may forward data packet 542 to gateway node 500. SA instance 514 may mark data packet 542 as having been redirected by SA instance 514 and further indicate that SA instance 514 is currently designated as inactive. Upon receiving data packet 542, gateway node 500 may identify data packet 542 as being associated with SA instance 510 and may identify that SA instance 510 is designated as active. SA instance 510 may further identify that data packet 542 has been forwarded by SA instance 514. Having received data packet 542 and identified SA instance 510 as associated with data packet 542, gateway node 500 may utilize SA instance 510 to encrypt data packet 542, resulting in encrypted data packet 544 for transmission into network environment 508. In encrypting data packet 542, gateway node 500 may utilize SA instance 510 to obtain the next available sequence number associated with "SA-1" and mark data packet 544 with the obtained sequence number 546. As the active SA instance for "SA-1," SA instance 510 may update SA table 522 to reflect that an additional packet associated with "SA-1" has been received from SA instance 514.

At step 9, gateway node 502 may receive an unencrypted data packet 548 from LAN network environment 506. Gateway node 502 may identify unencrypted data packet 548 as being associated with "SA-1," identify SA instance 512 as being gateway node 502's SA instance for "SA-1," and identify that SA instance 512 is designated as inactive. In response to determining that SA instance 512 is designated as inactive, gateway node 502 may utilize SA instance 512 to identify an active SA instance associated with data packet 548. For example, gateway node 502 may utilize SA instance 512 to identify SA instance 510 as being associated with data packet 548 and as being designated as active. Having identified SA instance 510 as being associated with data packet 548 and as designated as active, at step 10, SA instance 512 may forward data packet 548 to gateway node 500. SA instance 512 may mark data packet 548 as having been redirected by SA instance 512 and further indicate that SA instance 512 is currently designated as inactive. In accordance with embodiments of the subject matter described herein, upon receiving data packet 548, SA instance 510 may determine that an unbalanced condition exists between itself and SA instances 512 and 514. For example, SA instance 510 may determine that an unbalanced condition exists based on information stored in SA table 522 (e.g., SA instance 510 may determine that SA table 522 indicates that SA instance 512 is receiving more packets associated with "SA-1" than SA instances 510 and 514 are). In response to determining that an unbalanced condition exists, SA instance 510 may identify another SA instance to be designated as the active SA instance for "SA-1" and may designate itself an inactive SA instance and the identified SA instance as the active SA instance for "SA-1." For example, SA instance 510 may identify SA instance 512 to be designated as the active SA instance for "SA-1" and may designate itself inactive and SA instance 512 as the active SA instance for "SA-1."

At step 11, SA instance 510 may forward data packet 548 to SA instance 512. SA instance 510 may mark data packet 548 to indicate that an unbalanced condition exists and that it is designating SA instance 512 as the active SA instance for "SA-1." Upon receiving data packet 548, SA instance 512 may identify data packet 548 as being marked by SA instance 510 to indicate that an unbalanced condition exists and that SA instance 512 should assume the role as the active SA instance for "SA-1." Referring to FIG. 5C, at step 12, SA instance 512 may send an exception message to the control plane indicating that an unbalanced condition exists and it has assumed the role as the active SA instance for "SA-1." As the active SA instance, SA instance 512 may begin to provide periodic sequence number updates to SA instances 510 and 514. SA instance 512 may additionally create and/or maintain SA table 550 for "SA-1." Having assumed the role as the active SA instance for "SA-1," gateway node 502 may utilize SA instance 512 to encrypt data packet 548, resulting in encrypted data packet 552 for transmission into network environment 508. In encrypting data packet 548, gateway node 502 may utilize SA instance 512 to obtain the next available sequence number associated with "SA-1" and mark data packet 552 with the obtained sequence number 554.

At step 13, gateway node 500 may receive an unencrypted data packet 556 from LAN network environment 506. Gateway node 500 may identify unencrypted data packet 556 as being associated with "SA-1," identify SA instance 510 as being gateway node 500's SA instance for "SA-1," and identify that SA instance 510 is designated as inactive. In response to determining that SA instance 510 is designated as inactive, gateway node 500 may utilize SA instance 510 to identify an active SA instance associated with data packet 556. For example, gateway node 500 may utilize SA instance 510 to identify SA instance 512 as being associated with data packet 556 and as being designated as active. Having identified SA instance 512 as being associated with data packet 556 and as designated as active, at step 14, SA instance 510 may forward data packet 556 to gateway node 502. SA instance 510 may mark data packet 556 as having been redirected by SA instance 510 and further indicate that SA instance 510 is currently designated as inactive. Upon receiving data packet 556, gateway node 502 may identify data packet 556 as being associated with SA instance 512 and may identify that SA instance 512 is designated as active. SA instance 512 may further identify that data packet 556 has been forwarded by SA instance 510. Having received data packet 556 and identified SA instance 512 as associated with data packet 556, gateway node 502 may utilize SA instance 512 to encrypt data packet 556, resulting in encrypted data packet 558 for transmission into network environment 508. In encrypting data packet 556, gateway node 502 may utilize SA instance 512 to obtain the next available sequence number associated with "SA-1" and mark data packet 558 with the obtained sequence number 560. As the active SA instance for "SA-1," SA instance 512 may update SA table 550 to reflect that an additional packet associated with "SA-1" has been received from SA instance 510.

At step 15, gateway node 504 may receive an unencrypted data packet 562 from LAN network environment 506. Gateway node 504 may identify unencrypted data packet 562 as being associated with "SA-1," identify SA instance 514 as being gateway node 504's SA instance for "SA-1," and identify that SA instance 514 is designated as inactive. In response to determining that SA instance 514 is designated as inactive, gateway node 504 may utilize SA instance 514 to identify an active SA instance associated with data packet 562. For example, gateway node 504 may utilize SA instance 514 to identify SA instance 512 as being associated with data packet 562 and as being designated as active. Having identified SA instance 512 as being associated with data packet 562 and as designated as active, at step 16, SA instance 514 may forward data packet 562 to gateway node 502. SA instance 514 may mark data packet 562 as having been redirected by SA instance 514 and further indicate that SA instance 514 is currently designated as inactive. Upon receiving data packet 562, gateway node 502 may identify data packet 562 as being associated with SA instance 512 and may identify that SA instance 512 is designated as active. SA instance 512 may further identify that data packet 562 has been forwarded by SA instance 514. Having received data packet 562 and identified SA instance 512 as associated with data packet 562, gateway node 502 may utilize SA instance 512 to encrypt data packet 562, resulting in encrypted data packet 564 for transmission into network environment 508. In encrypting data packet 562, gateway node 502 may utilize SA instance 512 to obtain the next available sequence number associated with "SA-1" and mark data packet 564 with the obtained sequence number 566. As the active SA instance for "SA-1," SA instance 512 may update SA table 550 to reflect that an additional packet associated with "SA-1" has been received from SA instance 514.

Figure 6:
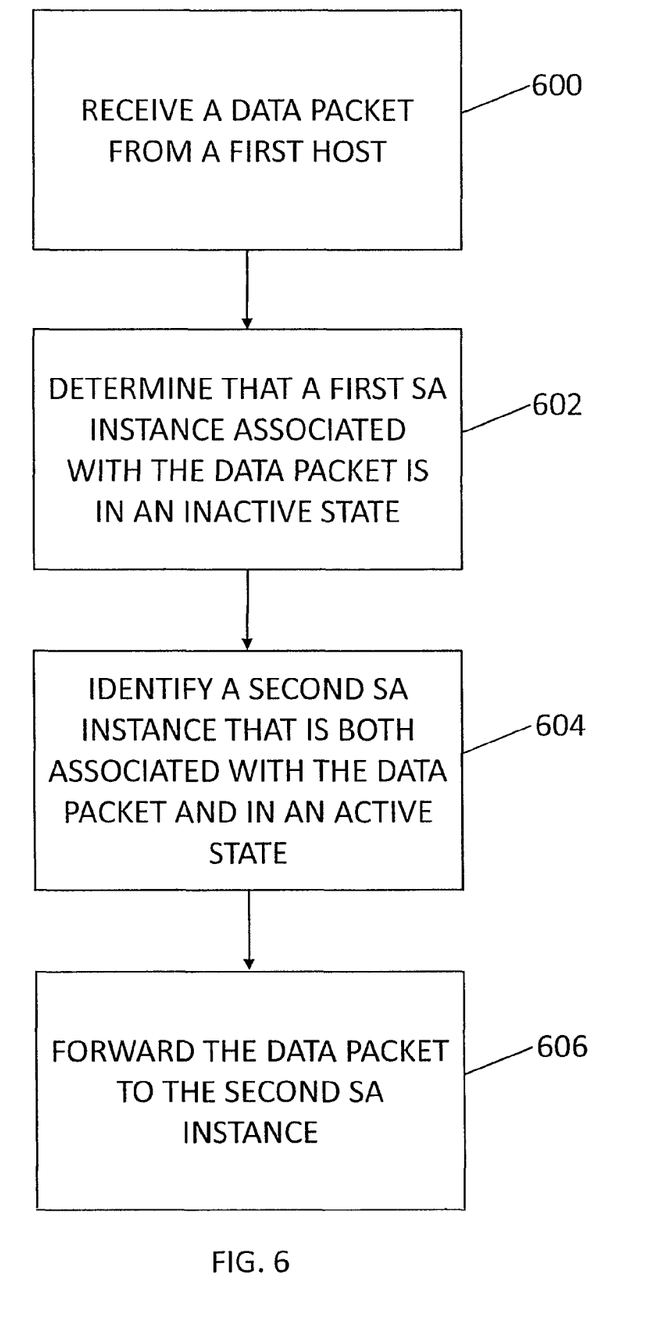
FIG. 6 is a flow chart illustrating an exemplary process for adaptively 20 assigning an active SA instance in accordance with embodiments of the subject matter described herein.

FIG. 6 is a flow chart illustrating an exemplary process for adaptively assigning an active SA instance in accordance with embodiments of the subject matter described herein. Referring to FIG. 6, in step 600, a data packet is received from a first host. For example, data packet 524 may be received from a first host via network environment 506. In step 602, it is determined that a first SA instance associated with the data packet is in an inactive state. For example, it may be determined that SA instance 512 is designated as inactive. In step 604, a second SA instance that is both associated with the data packet and in an active state is identified. For example, SA instance 510, which may be both associated with data packet 524 and designated as active, may be identified. In step 606, the data packet is forwarded to the second SA instance. For example, data packet 524 may be forwarded to SA instance 510.

Figure 7:
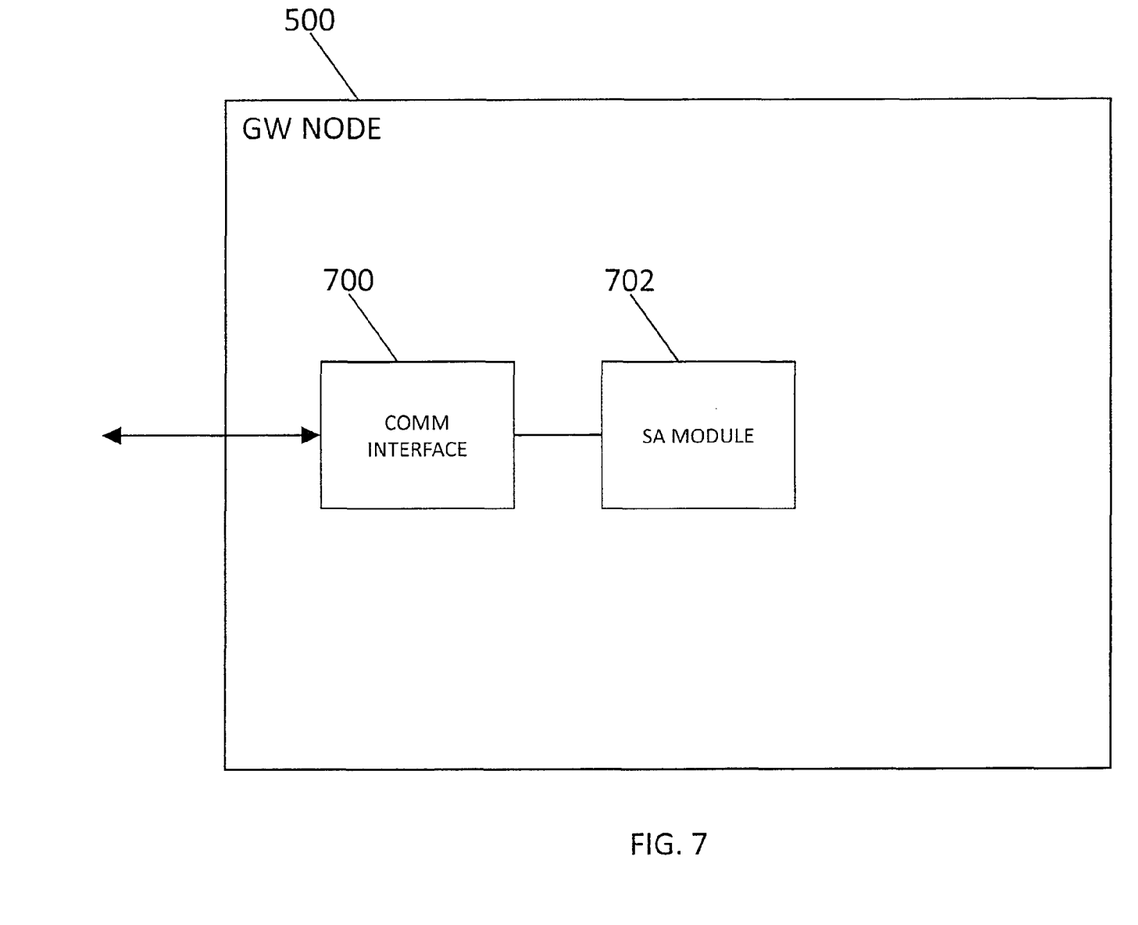
FIG. 7 is a block diagram of an exemplary gateway node for adaptively assigning an active SA instance in accordance with embodiments of the subject matter described herein.

FIG. 7 is a block diagram of an exemplary gateway node for adaptively assigning an active SA instance in accordance with embodiments of the subject matter described herein. Referring to FIG. 7, gateway node 500 includes a communication interface 700 for communicating with other network nodes via any suitable protocol.

For example, communication interface 700 may communicate with other network nodes via transmission control protocol (TCP)/Internet protocol (IP). Gateway node 500 further includes SA module 702. SA module 702 is configured to utilize communication interface 700 to receive, from a first host, a data packet. For example, SA module 702 may utilize communication interface 700 to receive data packet 524 from a host via network environment 506. SA module 702 is further configured to determine that a first SA instance associated with the data packet is in an inactive state. For example, SA module 702 may determine that SA instance 512 is designated as inactive. SA module 702 is further configured to identify a second SA instance that is both associated with the data packet and in an active state. For example, SA module 702 may identify SA instance 510 as both being associated with data packet 524 and designated as active. SA module 702 is further configured to utilize communication interface 700 to forward the data packet to the second SA instance. For example, SA module 702 may utilize communication interface 700 to forward data packet 524 to SA instance 510.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

The invention claimed is:

1. A method for communicating encrypted data, the method comprising:
at a first gateway node:
receiving a first data packet from a second gateway node, wherein the first gateway node and the second gateway node are configured to be in a redundant gateway configuration, the first gateway node having a first security association (SA) instance associated with the first data packet and in an active state, the second gateway node having a second SA instance associated with the first data packet and in an inactive state, wherein each of SA instances is a process to assure secure communications between the first gateway node and the second gateway node and each gateway node has both of an active SA instance and inactive SA instance;
detecting that an unbalanced condition exists between the first SA instance and the second SA instance;
determining at the first gateway node that the second SA instance should be designated as active and the first SA instance should be designated as inactive;
designating the second SA instance as active and forwarding the first data packet to the second gateway node; and
designating the first SA instance as inactive.

2. The method of claim 1 comprising: receiving a second data packet; determining that the first SA instance is designated as inactive; identifying the second SA instance as both being associated with the second data packet and being designated as active; and forwarding the second data packet to the second SA instance.

3. The method of claim 1 wherein the determination is based on a total number of data packets received by the first gateway node during a sampling period and a total number of data packets received by the second gateway node during the sampling period.

4. The method of claim 1 wherein the determination is based on a processor utilization for the first gateway node and a processor utilization for the second gateway node.

5. The method of claim 1 wherein the determination is based on a percentage of total traffic handled by the first gateway node during a sampling period that is encrypted and a percentage of total traffic handled by the second gateway node during the sampling period that is encrypted.

6. The method of claim 1 wherein the determination is made in response to at least one of a time based trigger; a packet count based trigger; a byte count based trigger; a configuration event trigger; an external network trigger; and a resource limit threshold trigger.

7. The method of claim 1 wherein designating the second SA instance as active comprises marking the first data packet to indicate that the second SA instance should assume a role as active SA instance and sending the first data packet to the second gateway node.

8. The method of claim 7 wherein marking the first data packet further comprises indicating in the first data packet that the unbalanced condition exists.

9. The method of claim 1 further comprising:
receiving periodic sequence number updates at the inactive first SA instance from the active second SA instance.

10. A system for communicating encrypted data, the system comprising:
a first gateway node having both of an active security association (SA) instance and inactive SA instance in a redundant gateway configuration with a second gateway node, the first gateway node comprising:
a communication interface; and
a SA module configured configured to:
utilize the communication interface to receive, from the second gateway node, a data packet;
determine that a first SA instance at the first gateway node and associated with the data packet is in an active state, wherein each of SA instances is a process to assure secure communications between the first gateway node and the second gateway node and each gateway node has both of an active SA instance and inactive SA instance;
detecting that an unbalanced condition exists between the first SA instance and a second SA instance at the second gateway node;
designating the second SA instance as active and forwarding the data packet to the second gateway node; and
designating the first SA instance as active.

11. The system of claim 10, wherein the SA module is further configured to:
designate the first SA instance as inactive.

12. The system of claim 11 wherein the data packet comprises an Internet protocol security (IPsec) packet.

13. The system of claim 10 wherein the first SA instance is configured to calculate a total number of packets forwarded by the second SA instance to the first SA instance.

14. The system of claim 10 wherein the first SA instance is configured to identify the data packet as having been forwarded by the second SA instance.

15. The system of claim 10 wherein the first SA instance is further configured to mark the data packet to indicate that the unbalanced condition exists in response to determining that the unbalanced condition exists.

16. The system of claim 10 wherein the first SA instance is configured to designate the second SA instance as active by marking the data packet to indicate that the second SA instance should assume a role as active SA instance and sending the data packet to the second gateway node.

17. A non-transitory computer readable medium comprising computer executable instructions that when executed by a processor of a computer control the computer to perform steps comprising:
at a first gateway node having a first security association (SA) instance being active:
receiving a plurality data packets forwarded from a second gateway node having a second SA instance, the second SA instance being inactive, wherein each of SA instances is a process to assure secure communications between the first gateway node and the second gateway node and each gateway node has both of an active SA instance and active SA instance;
determining that the second SA instance receives more data packet traffic than does the first SA instance;
marking at the first gateway node a first one of the plurality of data packets to indicate that an unbalanced condition exists between the first SA instance and the second SA instance; and
forwarding the first data packet to the second SA instance to designate the second SA instance as active.

18. The computer readable medium of claim 17 further comprising computer executable instructions that when executed by a processor of a computer control the computer to perform at a first gateway node having the first SA instance:
marking the first one of the plurality of data packets to indicate the second SA instance should assume a role as an active SA instance.

19. The computer readable medium of claim 17 further comprising computer executable instructions that when executed by a processor of a computer control the computer to perform at a first gateway node having the first SA instance:
detecting the unbalanced condition by one or more of the following techniques:
detecting a total number of data packets received by the first gateway node during a sampling period and a total number of data packets received by the second gateway node during the sampling period;
detecting a processor utilization for the first gateway node and a processor utilization for the second gateway node; and
detecting a percentage of total traffic handled by the first gateway node during a sampling period that is encrypted and a percentage of total traffic handled by the second gateway node during the sampling period that is encrypted.

20. The computer readable medium of claim 17 further comprising computer executable instructions that when executed by a processor of a computer control the computer to perform at a first gateway node having the first SA instance:
receiving a subsequent data packet; determining that the first SA instance is designated as inactive; identifying the second SA instance as both being associated with the subsequent data packet and being designated as active; and forwarding the subsequent data packet to the second SA instance.

* * * * *